(12) United States Patent
Leanza et al.

(10) Patent No.: US 8,128,160 B2
(45) Date of Patent: Mar. 6, 2012

(54) TOWER BAR CONSTRUCTION FOR A MOTOR VEHICLE

(75) Inventors: Anthony Leanza, Powell, OH (US); Christos Agouridis, Jr., Dublin, OH (US); Takashi Nakano, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 293 days.

(21) Appl. No.: 12/486,696

(22) Filed: Jun. 17, 2009

(65) Prior Publication Data

US 2010/0320712 A1 Dec. 23, 2010

(51) Int. Cl.
*B60K 37/00* (2006.01)

(52) U.S. Cl. .......... 296/203.02; 296/193.09; 296/187.09

(58) Field of Classification Search ............. 296/203.02, 296/205, 187.09, 193.09, 203.01, 193.02; 280/124.106, 124.107, 124.134, 124.147, 280/124.152, 124.155
See application file for complete search history.

(56) References Cited

U.S. PATENT DOCUMENTS

| 2,193,949 | A | 3/1940 | Tibbetts |
| 2,213,010 | A | 8/1940 | MacPherson |
| 2,817,557 | A | 12/1957 | Reynolds |
| 3,086,606 | A | 4/1963 | Schwiering et al. |
| 3,188,132 | A | 6/1965 | Schwiering et al. |
| 3,211,491 | A | 10/1965 | Browne et al. |
| 3,625,561 | A | 12/1971 | Huber |
| 5,411,311 | A | 5/1995 | Shimmell et al. |
| 6,523,878 | B2 | 2/2003 | Scheidel |
| 6,755,461 | B2 | 6/2004 | Seksaria et al. |
| 6,773,057 | B2 | 8/2004 | Nomura |
| 6,834,910 | B2 | 12/2004 | Wendland et al. |
| 6,886,886 | B2 | 5/2005 | Seksaria et al. |
| 6,893,065 | B2 | 5/2005 | Seksaria et al. |
| 6,921,126 | B2 | 7/2005 | Suh et al. |
| 7,083,224 | B2 | 8/2006 | Yamamura et al. |
| 7,219,954 | B2 | 5/2007 | Gomi et al. |
| 7,328,909 | B2 | 2/2008 | Takayanagi et al. |
| 7,390,047 | B2 | 6/2008 | Hanakawa et al. |
| 7,404,596 | B2 | 7/2008 | Miyata et al. |
| 2003/0085592 | A1 | 5/2003 | Seksaria et al. |
| 2007/0246971 | A1 | 10/2007 | Hanakawa et al. |
| 2008/0150326 | A1 | 6/2008 | Maruyama et al. |
| 2008/0174150 | A1 | 7/2008 | Yamada |

FOREIGN PATENT DOCUMENTS

JP 3112789 5/1991
JP 2006111162 A * 4/2006

* cited by examiner

*Primary Examiner* — Glenn Dayoan
*Assistant Examiner* — Melissa A Black
(74) *Attorney, Agent, or Firm* — Plumsea Law Group, LLC

(57) ABSTRACT

A tower bar construction for a motor vehicle is disclosed. The tower bar construction includes a member extending from strut tower to strut tower. This component resists relative movement between strut towers. The construction also includes two continuous sections from each strut tower to an upper panel. These sections resist relative movement between strut towers and the upper panel. The tower bar construction includes a central reinforcing portion welded to an upper panel that resists torsion exerted on the section created by relative movement between strut towers and the upper panel.

20 Claims, 9 Drawing Sheets

TOWER BAR CONSTRUCTION FOR A MOTOR VEHICLE

BACKGROUND OF THE INVENTION

1. Field of the Invention

The present invention relates to motor vehicles and in particular to a tower bar construction for a motor vehicle.

2. Description of Related Art

In many vehicles there is a tendency for relative movement between two damper attachment points. There is also a tendency for relative movement between damper attachment locations along with their corresponding frame structure, and the firewall. By providing a rigid member between the two damper attachment points, as well as rigid members extending between the damper attachment areas and the firewall, the tendency for this relative movement can be reduced.

SUMMARY OF THE INVENTION

The invention discloses a tower bar construction for a motor vehicle. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drivetrain is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

In one aspect, the invention provides a motor vehicle, comprising: a vehicle body structure including an upper panel, a first strut tower and a second strut tower; a tower bar assembly configured to extend between the first strut tower, the second strut tower and the upper panel; the tower bar assembly including a central reinforcing portion, the central reinforcing portion further including a base portion and wherein a portion of the base portion is spaced apart from the upper panel; a first side reinforcing portion configured to connect a first side portion of the central reinforcing portion to the upper panel and a second side reinforcing portion configured to connect a second side portion of the central reinforcing portion to the upper panel; and wherein the central reinforcing portion, the first side reinforcing portion, the second side reinforcing portion and the upper panel comprise a box-like cross-section.

In another aspect, the invention provides a motor vehicle, comprising: a vehicle body structure including an upper panel, a first strut tower and a second strut tower; the upper panel including a forward edge extending in a substantially lateral direction and a rearward edge extending in the substantially lateral direction; a cross member attached to the rearward edge of the upper panel; a tower bar assembly configured to extend between the first strut tower, the second strut tower and the upper panel; the tower bar assembly including a central reinforcing portion configured to attach to the upper panel; and where the central reinforcing portion extends between the forward edge of the upper panel and the cross member.

In another aspect, the invention provides a motor vehicle, comprising: a vehicle body structure including an upper panel, a first strut tower and a second strut tower; a tower bar assembly configured to extend between the first strut tower, the second strut tower and the upper panel; the tower bar assembly including a first extended member associated with the first strut tower and a second extended member associated with the second strut tower; the first extended member including a first end portion attached to the first strut tower, a second end portion associated with the upper panel and an intermediate portion disposed between the first end portion and the second end portion; the tower bar assembly including a tower bar component extending between the first extended member and the second extended member; and where a first end portion of the tower bar component is attached to the intermediate portion of the first extended member.

Other systems, methods, features and advantages of the invention will be, or will become, apparent to one of ordinary skill in the art upon examination of the following figures and detailed description. It is intended that all such additional systems, methods, features and advantages included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE EXEMPLARY EMBODIMENTS

Figure 1:
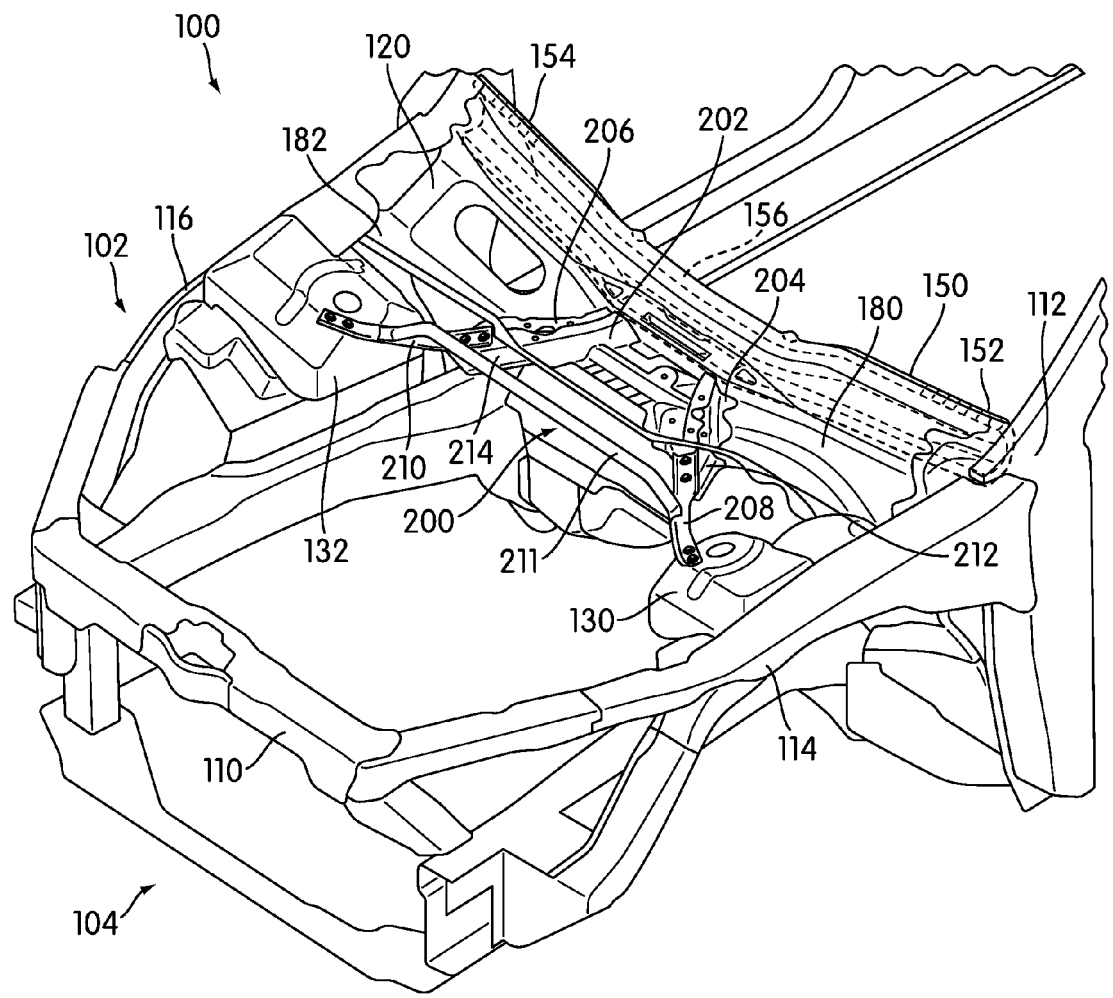
FIG. 1 is an isometric view of an embodiment of a vehicle body structure including a tower bar assembly.
Figure 2:
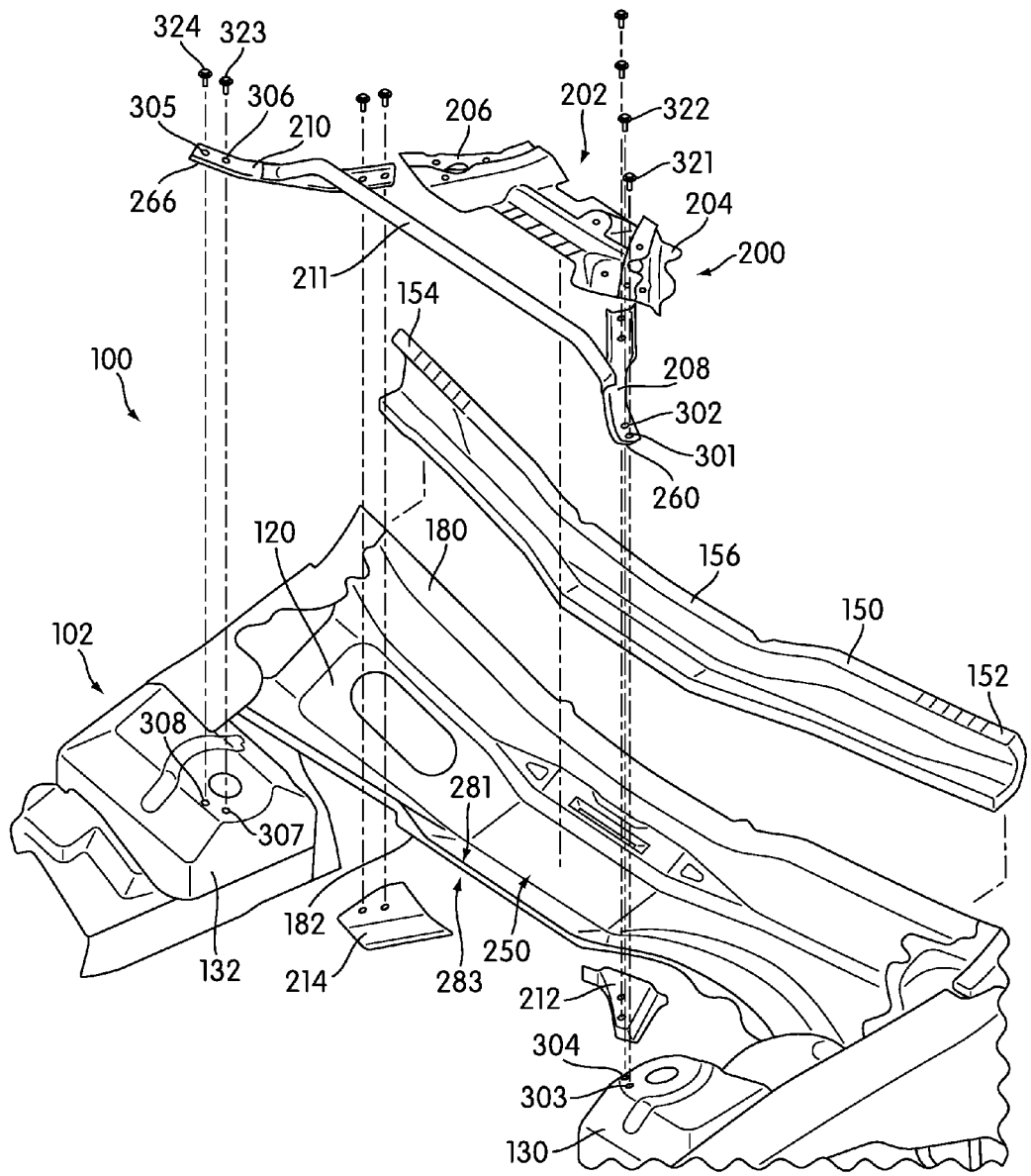
FIG. 2 is an exploded isometric view of an embodiment of a vehicle body structure including a tower bar assembly and a cross member.
Figure 3:
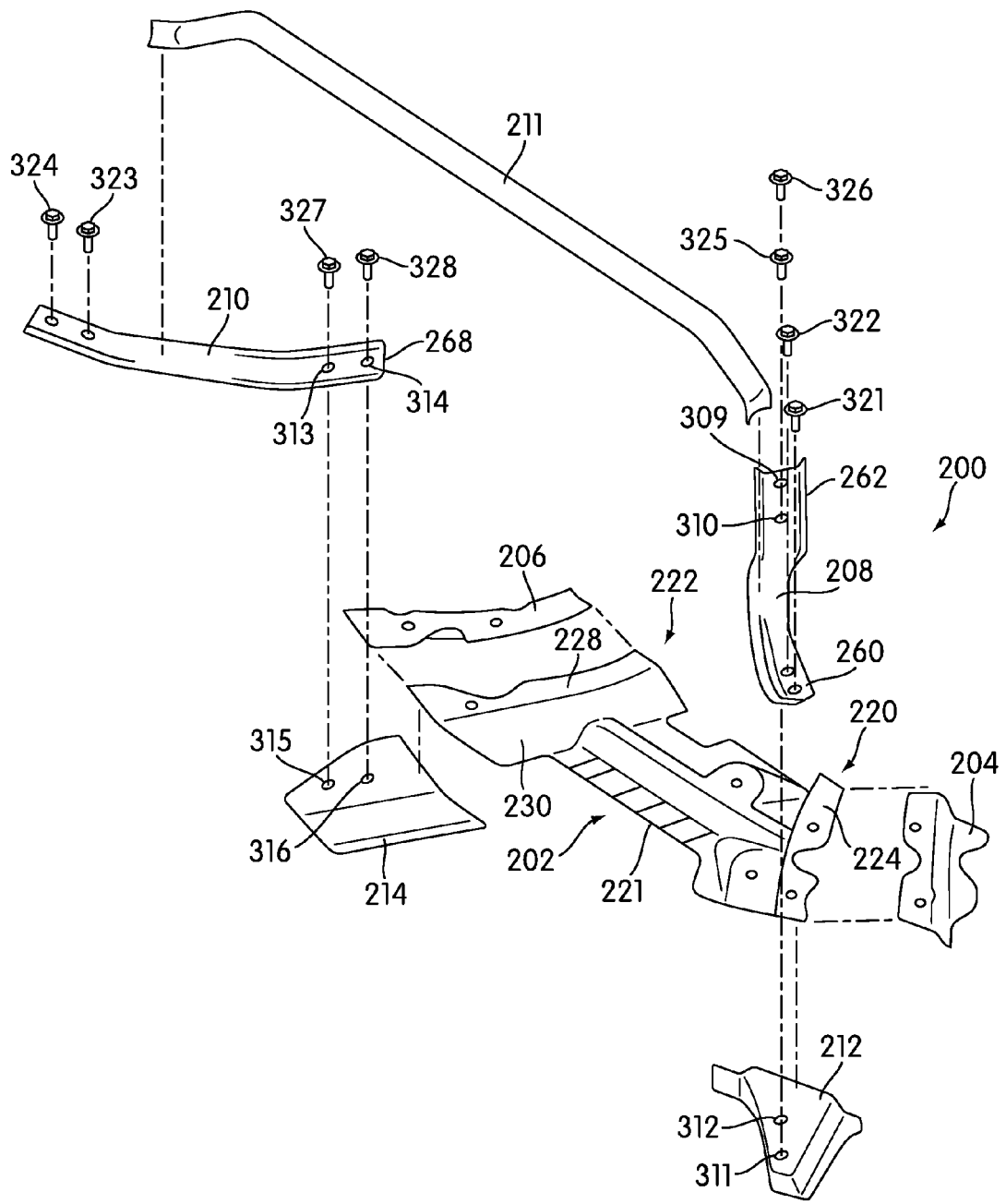
FIG. 3 is an exploded isometric view of an embodiment of a tower bar assembly.

FIGS. 1 through 3 illustrate embodiments of a portion of motor vehicle 100. In particular, FIG. 1 is an isometric view of a front portion of motor vehicle 100. Also, FIG. 2 is an exploded isometric view of a front portion of motor vehicle 100. Also, FIG. 3 is an exploded isometric view of a component of motor vehicle 100. Referring to FIGS. 1-3, for purposes of clarity, only some portions of motor vehicle 100 are illustrated in the current embodiment. In particular, vehicle body structure 102 of motor vehicle 100 is illustrated. The term "vehicle body structure" as used throughout this detailed description and in the claims refers to any structural components of a motor vehicle configured to provide support for a motor vehicle. In some cases, the vehicle body structure may be associated with a chassis or frame of a motor vehicle. More particularly, front portion 104 of vehicle body structure 102 is shown. It will be understood that vehicle body structure 102 may extend throughout the entirety of motor vehicle 100.

For consistency and convenience, directional adjectives are employed throughout this detailed description corresponding to the illustrated embodiments. These directional adjectives may be used with respect to a motor vehicle. In addition, these directional adjectives may be used with respect to one or more components of a motor vehicle, for example, a tower bar assembly. The term "longitudinal" as used throughout this detailed description and in the claims refers to a direction extending a length of a component. Also, the term "lateral" as used throughout this detailed description and in the claims refers to a direction extending a width of a component. Furthermore, the term "vertical" as used throughout this detailed description and in the claims refers to a direction generally perpendicular to a lateral and longitudinal direction.

Front portion 104 of vehicle body structure 102 can be provided with various regions. Front portion 104 can include forward portion 110 that is associated with a front of a motor vehicle. Likewise, front portion 104 can include rearward portion 112 that is disposed opposite of forward portion 110. In some cases, rearward portion 112 can be disposed adjacent to a cabin portion of vehicle body structure 102, which may house occupants. Front portion 104 can also include first side portion 114 and second side portion 116, each of which extends between forward portion 110 and rearward portion 112. In some cases, first side portion 114 and second side portion 116 can be associated with wheel housings of motor vehicle 100.

Generally, forward portion 110, rearward portion 112, first side portion 114 and second side portion 116 may form a box like structure which is generally open on the top and bottom surfaces. This box like structure provides space for receiving various components of a motor vehicle such as an engine, a radiator, a battery, as well as other components. Furthermore, the top of the box like structure may be covered using a hood or similar provisions.

In some embodiments, vehicle body structure 102 can include upper panel 120. Upper panel 120 may be any type of paneling. For example, in some cases, upper panel 120 could be a cowl box. In some cases, upper panel 120 can be associated with a dashboard of motor vehicle 100. In particular, upper panel 120 can provide structural support to a dashboard mounted within a cabin of motor vehicle 100. In this embodiment, upper panel 120 can include forward edge 182 and rearward edge 180. In particular, forward edge 182 is located closer to forward portion 110, while rearward edge 180 is located closer to rearward portion 112.

Vehicle body structure 102 can include provisions for housing struts associated with wheels of motor vehicle 100. In one embodiment, vehicle body structure 102 can include first strut tower 130 and second strut tower 132. In some cases, first strut tower 130 can be associated with first side portion 114. Likewise, second strut tower 132 can be associated with second side portion 116. With this arrangement, first strut tower 130 and second strut tower 132 may provide reinforcement for wheel housings associated with first side portion 114 and second side portion 116, respectively.

A vehicle body structure can include provisions for reinforcing an upper panel. In some embodiments, vehicle body structure 102 can include cross member 150 (shown in phantom in FIG. 1). Generally, cross member 150 can be associated with any portion of upper panel 120. In some cases, cross member 150 can be configured to reinforce rearward edge 180 of upper panel 120. In one embodiment, cross member 150 may be disposed behind rearward edge 180. In other cases, however, cross member 150 can be configured to reinforce other portions of upper panel 120. With this arrangement, cross member 150 can help reinforce upper panel 120 in order to enhance support for vehicle body structure 102, especially in a lateral direction.

Generally, cross member 150 can be provided with any length. In some embodiments, cross member 150 can extend between first side portion 114 and second side portion 116 of vehicle body structure 102. In other embodiments, cross member 150 may only extend along a portion of upper panel 120. In an exemplary embodiment, cross member 150 can include first end portion 152 and second end portion 154 that are associated with first side portion 114 and second side portion 116, respectively, of vehicle body structure 102. In addition, cross member 150 can include central portion 156 that is disposed between first end portion 152 and second end portion 154. In particular, central portion 156 of cross member 150 can be configured to reinforce a central portion of upper panel 120.

During operation, strut towers may experience loads that cause flexing between the strut towers and the chassis or frame of the vehicle. This flexing may degrade steering precision, especially during high load conditions such as cornering and breaking. In an exemplary embodiment, a vehicle body structure can include provisions to reduce the flexing of strut towers in order to improve steering precision and overall driving comfort.

In an exemplary embodiment, vehicle body structure 102 can be associated with tower bar assembly 200. Generally, tower bar assembly 200 can be associated with any components of vehicle body structure 102. In some embodiments, tower bar assembly 200 can be associated with first strut tower 130 and second strut tower 132. In addition, tower bar assembly 200 can be associated with upper panel 120.

In different embodiments, the shape of tower bar assembly 200 can vary. In some embodiments, tower bar assembly 200 can have a substantially triangular shape. In other embodiments, tower bar assembly 200 can have a substantially trapezoidal shape. In still other embodiments, tower bar assembly 200 can have any other shape including, but not limited to: circular, oval-like, polygonal, regular polygonal, irregular polygonal as well as any other type of shape.

Tower bar assembly 200 can comprise multiple portions. In one embodiment, tower bar assembly 200 may include central reinforcing portion 202. In addition, tower bar assembly 200 may include first side reinforcing portion 204 and second side reinforcing portion 206. In some cases, first side reinforcing portion 204 may be disposed adjacent to central reinforcing portion 202 in a substantially lateral direction. Likewise, second side reinforcing portion 206 may be disposed adjacent to central reinforcing portion 202 in a substantially lateral direction.

Tower bar assembly 200 may also include first extended member 208 and second extended member 210. In some embodiments, first extended member 208 and second extended member 210 may be configured to extend from first side reinforcing portion 204 and second side reinforcing portion 206, respectively. In particular, first extended member 208 may extend from first side reinforcing portion 204 to first strut tower 130. Also, second extended member 210 may extend from second side reinforcing portion 206 to second strut tower 132.

In different embodiments, first extended member 208 and second extended member 210 may connect to first side reinforcing portion 204 and second side reinforcing portion 206 in various manners. In some cases, first extended member 208 and second extended member 210 may be attached directly to first side reinforcing portion 204 and second side reinforcing portion 206, respectively. In an exemplary embodiment, first extended member 208 may be connected to first bracket 212. Likewise, second extended member 210 may be connected to second bracket 214.

In some embodiments, first bracket 212 and second bracket 214 may be connected directly to first side reinforcing portion 204 and second side reinforcing portion 206, respectively. However, in another embodiment, first bracket 212 and second bracket 214 may be indirectly connected to first side reinforcing portion 204 and second side reinforcing portion 206, respectively. In one embodiment, first bracket 212 and first side reinforcing portion 204 may be connected to opposing sides of upper panel 120. Likewise, second bracket 214 and second side reinforcing portion 206 may be connected to opposing sides of upper panel 120. In the current embodiment, first bracket 212 and second bracket 214 may be connected to first side 283 of forward edge 182. Likewise, first side reinforcing portion 204 and second side reinforcing portion 206 may be connected to second side 281 of forward edge 182. In particular, forward edge 182 may be angled in the vertical direction. With this arrangement, first bracket 212 and first side reinforcing portion 204 may be connected via a portion of forward edge 182. Likewise, second bracket 214 and second side reinforcing portion 206 may be connected via a portion of forward edge 182. Using this arrangement, forward edge 182 of upper panel 120 may help distribute forces laterally between first bracket 212 and second bracket 214 as forces are also distributed between first bracket 212 and first side reinforcing portion 204 as well as between second bracket 214 and second side reinforcing portion 206.

A tower bar assembly can include provisions for transferring loads laterally between first strut tower 130 and second strut tower 132. In one embodiment, tower bar assembly 200 may include tower bar component 211. In some cases, tower bar component 211 can extend between first extended member 208 and second extended member 210. In different embodiments, tower bar component 211 can extend in any direction. In an exemplary embodiment, tower bar component 211 may extend in a substantially lateral direction with respect to vehicle body structure 202. With this arrangement, loads transferred from first strut tower 130 and second strut tower 132 to first extended member 208 and second extended member 210, respectively, can be shared through tower bar component 211.

In the current embodiment, tower bar assembly 200 comprises a plurality of distinct components. It will be understood, however, that in other embodiments, various distinct components of a tower bar assembly could be integrally formed. In other words, although one embodiment includes eight distinct components, other embodiments could include less than eight distinct components. For example, in another embodiment, first side reinforcing portion 204 and second side reinforcing portion 206 could be integrally formed with central reinforcing portion 202. In another example, tower bar component 211 may be integrally formed with first extended member 208 and second extended member 210. In still another example, first extended member 208, first bracket 212 and first side reinforcing portion 204 could be integrally formed as a single component. In different embodiments, therefore, a tower bar assembly may comprise different numbers of distinct components according to various manufacturing requirements. However, such variations may not change the overall structural properties of the tower bar assembly.

In different embodiments, each portion of a tower bar assembly can be associated with varying structural shapes. For example, in one embodiment central reinforcing portion 202, first side reinforcing portion 204 and second side reinforcing portion 206 comprise paneled portions that are formed into three dimensional shapes. This arrangement may allow central reinforcing portion 202, first side reinforcing portion 204 and second side reinforcing portion 206 to be shaped in a manner that helps resist torsion. Furthermore, in one embodiment, first extended member 208 and second extended member 210 form tube portions that have substantially circular or oval-like cross sections. In addition, tower bar component 211 also has a tube-like shape. With this arrangement, first extended member 208, second extended member 210 and tower bar component 211 may have shapes to resist bending. In still other embodiments, however, each component of a tower bar assembly 200 can have a substantially different shape or cross section.

In different embodiments, one or more portions of a tower bar assembly can be attached to one another or to a vehicle body structure in various ways. In some embodiments, one or more portions can be attached through welding. Generally, any type of welding can be used for welding one or more portions of a tower bar assembly to a vehicle body structure or to one another. Examples of welding techniques include, but are not limited to: gas metal arc welding (MIG welding), flux-cored arc welding (FCAW), gas tungsten arc welding (GTAW), submerged arc welding (SAW), atomic hydrogen welding, carbon arc welding, electroslag welding, electrogas welding and stud arc welding, as well as any other type of welding technique. In other embodiments, one or more portions can be attached using various fastening devices. Examples of fastening devices that may be used include, but are not limited to: screws, bolts, rivets, nails, clips, studs, pins, as well as any other types of fasteners. In still other embodiments, different portions of a tower bar assembly and/or a vehicle body structure can be connected in other ways.

In different embodiments, tower bar component 211 can be attached to other portions of tower bar assembly 200 in various ways. In some cases, tower bar component 211 can be attached to first extended member 208 and second extended member 210 using fastening devices. In other cases, tower bar component 211 can be welded directly to first extended member 208 and second extended member 210. In still other cases, tower bar component 211 can be integrally formed with first extended member 208 and/or second extended member 210.

In different embodiments, portions of tower bar assembly 200 can be attached to vehicle body structure 102 in different manners. In some embodiments, one or more portions of tower bar assembly 200 can be attached to vehicle body structure 102 through welding. In other embodiments, one or more portions of tower bar assembly 200 can be attached to vehicle body structure 102 through one or more fastening devices. In an exemplary embodiment, portions of tower bar assembly 200 can be attached to vehicle body structure 102 using a combination of fastening devices and/or welds.

In some embodiments, central reinforcing portion 202 can be attached directed to upper panel 120. In some cases, central reinforcing portion 202 can be welded directly to upper panel 120. In other cases, central reinforcing portion 202 can be attached to upper panel 120 using various types of fasteners, such as, but not limited to: screws, bolts, rivets or other types of fasteners. In still other cases, central reinforcing portion 202 can be attached to upper panel 120 using a combination of welding and fasteners. In other embodiments, central reinforcing portion 202 may be indirectly attached to upper panel 120. In some cases, central reinforcing portion 202 may be attached to upper panel 120 via first side reinforcing portion 204 and second side reinforcing portion 206. For example, in one embodiment, central reinforcing portion 202 may be suspended between first side reinforcing portion 204 and second side reinforcing portion 206. In still other embodiments, some portions of central reinforcing portion 202 may be directly attached to upper panel 120, while other portions of central reinforcing portion 202 may be attached to upper panel 120 using first side reinforcing portion 204 and second side reinforcing portion 206.

In some embodiments, first side reinforcing portion 204 and second side reinforcing portion 206 can be attached to central reinforcing portion 202. In other embodiments, first side reinforcing portion 204 and second side reinforcing portion 206 can be attached directly to upper panel 120. In an exemplary embodiment, first side reinforcing portion 204 and second side reinforcing portion 206 can be attached to both central reinforcing portion 202 and upper panel 120. For example, in one embodiment, first side reinforcing portion 204 can be welded to upper panel 120 as well as central reinforcing portion 202. In a similar manner, second side reinforcing portion 206 can be welded to upper panel 120 as well as central reinforcing portion 202. In other embodiments, first side reinforcing portion 204 and second side reinforcing portion 206 can be attached to central reinforcing portion 202 and/or upper panel 120 using various types of fasteners including, but not limited to: screws, bolts, rivets, as well as other types of fasteners. With this arrangement, first side reinforcing portion 204, central reinforcing portion 202 and second side reinforcing portion 206 may form a substantially continuous reinforcing portion for tower bar assembly 200.

In different embodiments, first extended member 208 and second extended member 210 may be attached to first strut tower 130 and second strut tower 132 in any manner. For example, in one embodiment, first extended member 208 and second extended member 210 may be welded directly to first strut tower 130 and second strut tower 132, respectively. In other embodiments, however, first extended member 208 and second extended member 210 may be fastened to first strut tower 130 and second strut tower 132 using any type of fastener, including, but not limited to: screws, bolts, rivets or any other type of fastener. In an exemplary embodiment, first extended member 208 and second extended member 210 may be removably fastened to first strut tower 130 and second strut tower 132, respectively.

Referring to FIG. 2, first end portion 260 of first extended member 208 may include first fastening hole 301 and second fastening hole 302. In addition, first strut tower 130 may include third fastening hole 303 and fourth fastening hole 304. With this arrangement, first end portion 260 of first extended member 208 may be removably fastened to first strut tower 130 using first fastener 321 and second fastener 322. In particular, first fastener 321 may be secured through first fastening hole 301 and third fastening hole 303. Likewise, second fastener 322 may be secured through second fastening hole 302 and fourth fastening hole 304. In an exemplary embodiment, first fastener 321 and second fastener 322 may be bolt type fasteners.

In addition, first end portion 266 of second extended member 210 may include fifth fastening hole 305 and sixth fastening hole 306. In addition, second strut tower 132 may include seventh fastening hole 307 and eighth fastening hole 308. With this arrangement, first end portion 266 of second extended member 210 may be removably fastened to second strut tower 132 using third fastener 323 and fourth fastener 324. In particular, third fastener 323 may be secured through sixth fastening hole 306 and seventh fastening hole 307. Likewise, fourth fastener 324 may be secured through fifth fastening hole 305 and eighth fastening hole 308. In an exemplary embodiment, third fastener 323 and fourth fastener 324 may be bolt type fasteners.

Referring now to FIG. 3, in different embodiments, first extended member 208 and second extended member 210 may be attached to first bracket 212 and second bracket 214, respectively, in various ways. For example, in one embodiment, first extended member 208 and second extended member 210 may be welded directly to first bracket 212 and second bracket 214, respectively. In other embodiments, however, first extended member 208 and second extended member 210 may be fastened to first bracket 212 and second bracket 214 using any type of fastener, including, but not limited to: screws, bolts, rivets or any other type of fastener. In an exemplary embodiment, first extended member 208 and second extended member 210 may be removably fastened to first bracket 212 and second bracket 214, respectively.

In some embodiments, second end portion 262 of first extended member 208 may include ninth fastening hole 309 and tenth fastening hole 310. In addition, first bracket 212 may include eleventh fastening hole 311 and twelfth fastening hole 312. With this arrangement, second end portion 262 of first extended member 208 may be removably fastened to first bracket 212 using fifth fastener 325 and sixth fastener 326. In particular, fifth fastener 325 may be secured through tenth fastening hole 310 and eleventh fastening hole 311. Likewise, sixth fastener 326 may be secured through ninth fastening hole 309 and twelfth fastening hole 312. In an exemplary embodiment, fifth fastener 325 and sixth fastener 326 may be bolt type fasteners.

In addition, second end portion 268 of second extended member 210 may include thirteenth fastening hole 313 and fourteenth fastening hole 314. In addition, second bracket 214 may include fifteenth fastening hole 315 and sixteenth fastening hole 316. With this arrangement, second end portion 268 of second extended member 210 may be removably fastened to second bracket 214 using seventh fastener 327 and eighth fastener 328. In particular, seventh fastener 327 may be secured through thirteenth fastening hole 313 and fifteenth fastening hole 315. Likewise, eighth fastener 328 may be secured through fourteenth fastening hole 314 and sixteenth fastening hole 316. In an exemplary embodiment, seventh fastener 327 and eighth fastener 328 may be bolt type fasteners.

A tower bar assembly can include provisions for resisting torsion between a central reinforcing portion and one or more extended members. In some cases, a central reinforcing portion can have a shape that helps resist vertical movements, especially at the connections between the central reinforcing portion and the extended members.

Figure 4:
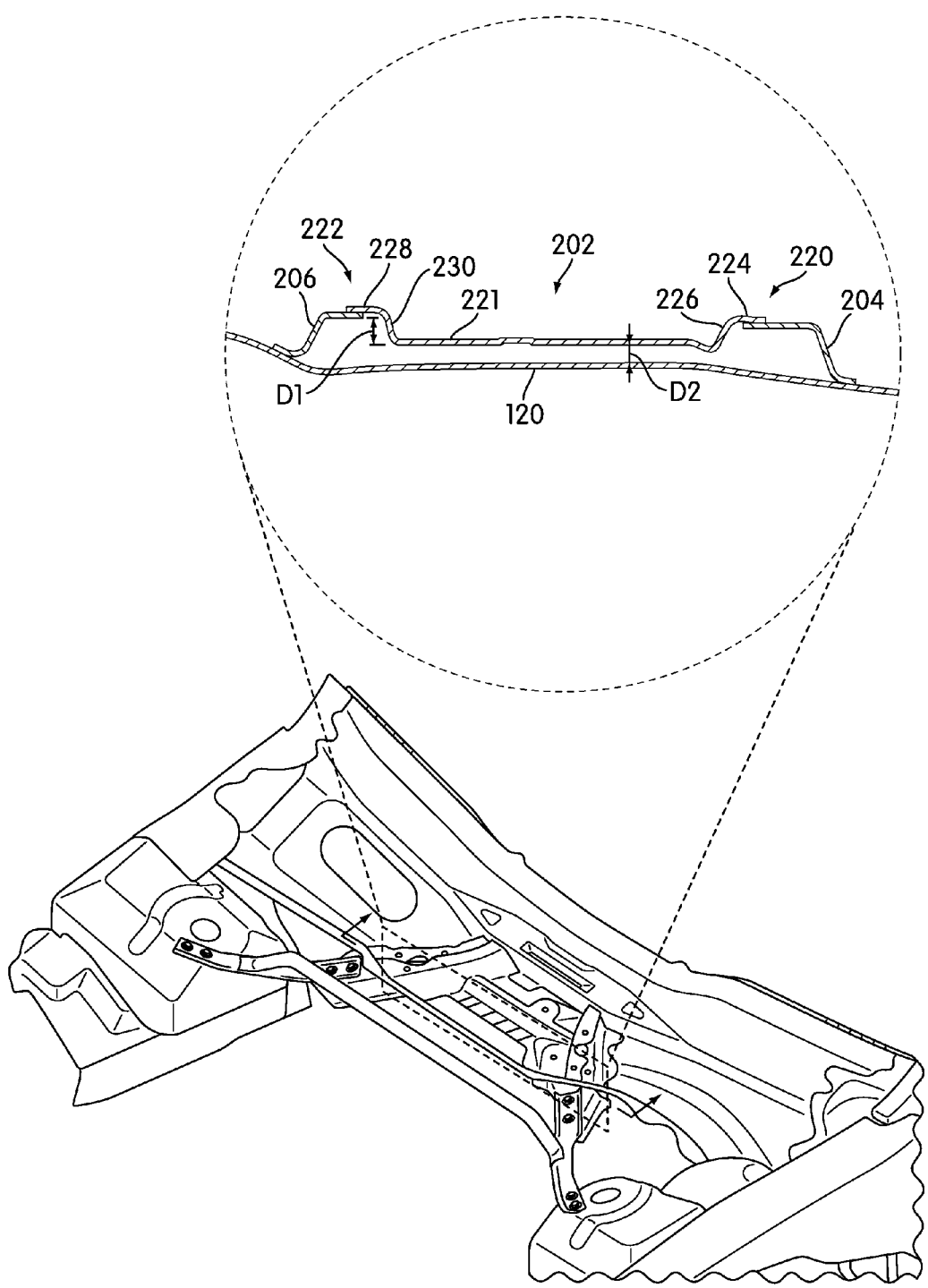
FIG. 4 is an exploded cross sectional view of an embodiment of a central reinforcing member confronting a recessed portion of an upper panel.

Referring to FIGS. 3 and 4, central reinforcing portion 202 can include first side portion 220 and second side portion 222. Generally, first side portion 220 and second side portion 222 are separated in a substantially lateral direction and are joined by base portion 221. In some cases, first side portion 220 can include first peripheral edge 224 and first peripheral wall 226. In an exemplary embodiment, first peripheral wall 226 may be angled with respect to first peripheral edge 224. In different embodiments, the angle formed between first peripheral edge 224 and first peripheral wall 226 may vary. In one embodiment, the angle could vary in the range between 50 and 150 degrees.

In addition, second side portion 222 can include second peripheral edge 228 and second peripheral wall 230. In an exemplary embodiment, second peripheral wall 230 may be angled with respect to second peripheral edge 228. In particular, the angle formed between second peripheral wall 230 and second peripheral edge 228 can be any angle. In some cases, the angle can vary in the range between 50 and 150 degrees.

First peripheral wall 226 and second peripheral wall 230 may also be angled with respect to base portion 221. Generally, the angle formed between base portion 221 and first peripheral wall 226 may be in the range between 50 and 150 degrees. Also, the angle formed between base portion 221 and second peripheral wall 230 may be in the range between 50 and 150 degrees.

With this arrangement, base portion 221 may be recessed below first peripheral edge 224 and second peripheral edge 228. In different embodiments, depth D1 of base portion 221 with respect to first peripheral edge 224 and second peripheral edge 228 may vary. In some cases, depth D1 may have a value in the range between 0 and 20 centimeters. In other cases, depth D1 may be greater than 20 centimeters. In an exemplary embodiment, depth D1 may have a value in the range between 0.5 and 10 centimeters.

In some embodiments, portions of base portion 221 may be spaced apart from upper panel 120. In particular, a portion of base portion 221 may be disposed a distance D2 above upper panel 120. Furthermore, central reinforcing portion 202, first side reinforcing portion 204 and second side reinforcing portion 206 may form a box-like cross section. This arrangement may create a welded box section that continues the structure of tower bar assembly 200 from first extended member 208 and second extended member 210 to cross member 150.

Figure 5:
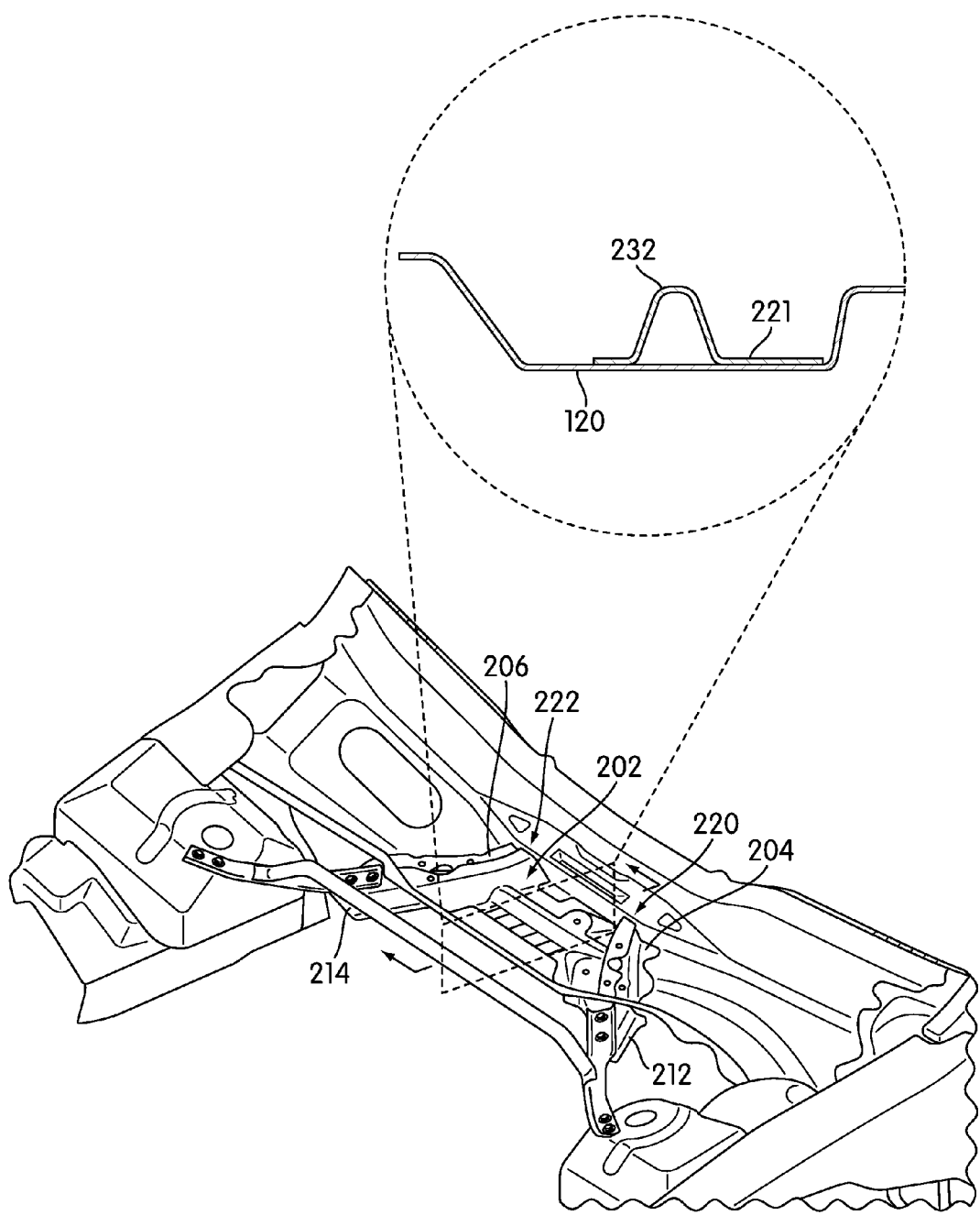
FIG. 5 is an enlarged lateral cross sectional view of an embodiment of a tower bar assembly.

Referring to FIG. 5, axial loads applied to tower bar assembly 200 may increase the tendency for vertical movement between first bracket 212 and first side reinforcing portion 204 and between second bracket 214 and second side reinforcing portion 206. In some embodiments, central reinforcing portion 202 can include provisions for reducing these vertical movements. In one embodiment, central reinforcing portion 202 can be shaped to help resist the vertical movements.

In some embodiments, central reinforcing portion 202 can include rib portion 232. In some embodiments, rib portion 232 may be a portion of base portion 221 that extends between first side portion 220 and second side portion 222. In particular, in some cases, rib portion 232 may extend in a substantially lateral direction. With this arrangement, rib portion 232 can provide enhanced strength for central reinforcing portion 202 by strengthening the connection between first side portion 220 and second side portion 222.

In some embodiments, rib portion 232 may have a rounded shape that extends upwardly from base portion 221. In some cases, rib portion 232 may have an arch-like cross sectional shape. Although rib portion 232 has a rounded shape in the current embodiment, in other embodiments rib portion 232 could have any other type of shape. For example, in another embodiment, rib portion 232 could have a box-like cross sectional shape. With this arrangement, central reinforcing portion 202 may be configured as a welded torsion section that resists vertical movement of first extended member 208 and second extended member 210 with respect to central reinforcing portion 202.

A tower bar assembly can include provisions for enhancing lateral stability between strut towers. In some embodiments, a tower bar component can be connected between extended members of a tower bar assembly in a manner than enhances lateral stability.

Figure 6:
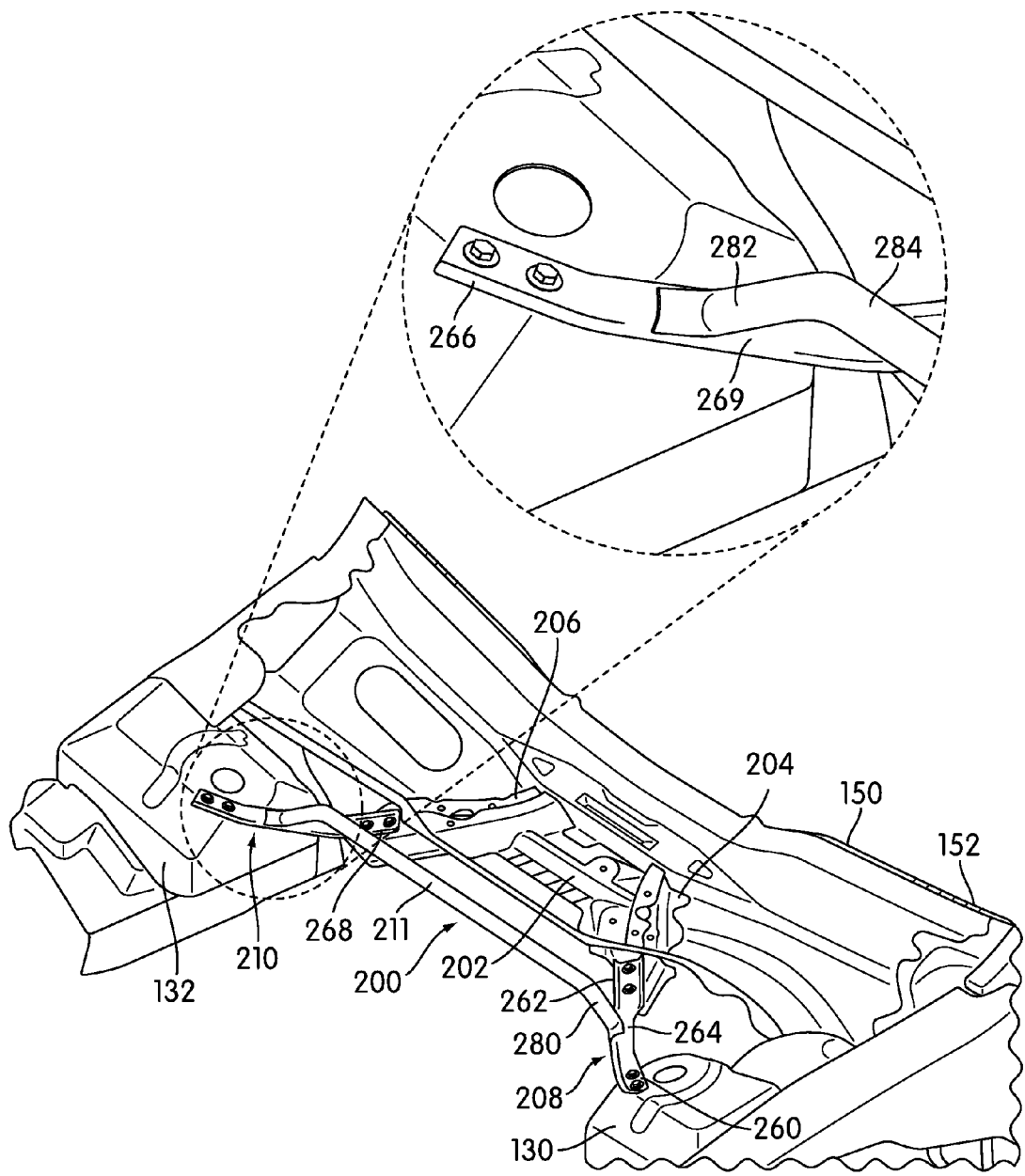
FIG. 6 is an enlarged longitudinal cross sectional view of an embodiment of a tower bar assembly.

Referring to FIG. 6, tower bar component 211 includes first end portion 280 and second end portion 282. In some embodiments, first end portion 280 may be attached to intermediate portion 264 of first extended member 208. In other words, first end portion 280 of tower bar component 211 may be attached to first end portion 260 and second end portion 262 of first extended member 208. In a similar manner, second end portion 282 of tower bar component 211 may be attached to intermediate portion 269 of second extended member 210. In other words, second end portion 282 of tower bar component 211 may be attached between first end portion 266 and second end portion 268 of second extended member 210. With this arrangement, tower bar component 211 may provide increased lateral strength for tower bar assembly 200 by reinforcing intermediate portions of first extended member 208 and second extended member 210.

In some embodiments, one or more end portions of a tower bar component can be angled. In one embodiment, first end portion 280 may be angled with respect to intermediate portion 284. Also, second end portion 282 may be angled with respect to intermediate portion 284. This angled configuration for first end portion 280 and second end portion 282 can help reduce any tendency for tower bar assembly 200 to bend or twist, as intermediate portion 284 is raised in a substantially vertical direction over first extended member 208 and second extended member 210.

Tower bar assembly 200 may be associated with cross member 150. In some embodiments, tower bar assembly 200 may be disposed adjacent to cross member 150. In some embodiments, one or more portions of tower bar assembly 200 can be configured to attach to cross member 150. In some cases, central reinforcing portion 202 can be attached to central portion 156 of cross member 150. In addition, in some cases, first side reinforcing portion 204 and second side reinforcing portion 206 can both be attached to central portion 156 of cross member 150. In other embodiments, however, one or more portions of tower bar assembly 200 may be spaced apart from cross member 150.

Figure 7:
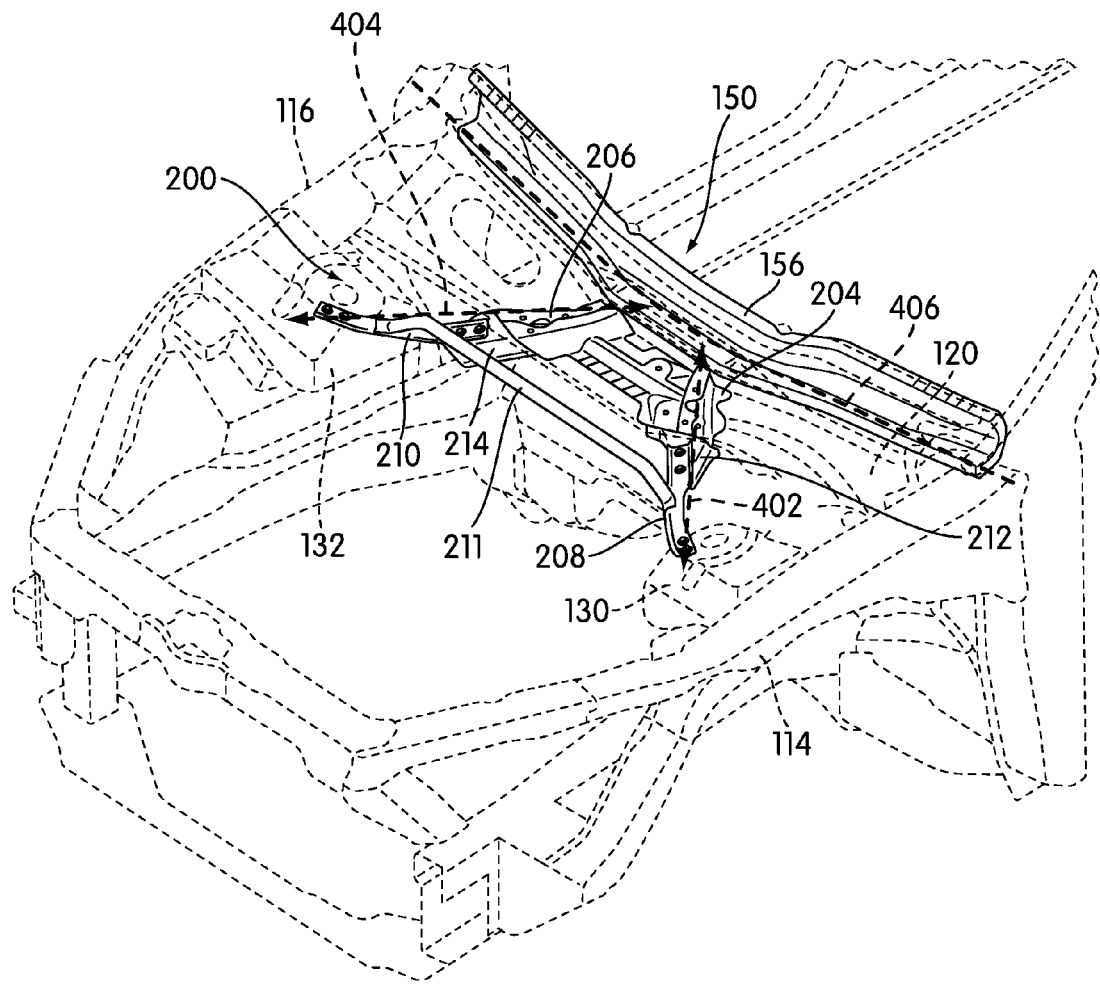
FIG. 7 is a schematic view of an embodiment of a tower bar assembly distributing forces throughout a vehicle body structure.

Referring to FIG. 7, tower bar assembly 200 may be configured to enhance the structural stability of vehicle body structure 102. As illustrated, first side reinforcing portion 204 and second side reinforcing portion 206 are configured to continue the structure of first extended member 208 and second extended member 210, respectively. With this arrangement, first load bearing path 402 is provided between first strut tower 130 and cross member 150. In a similar manner, second load bearing path 404 is provided between second strut tower 132 and cross member 150.

A vehicle body structure can also include provisions for enhancing front end lateral stability. In the current embodiment, the combination of tower bar assembly 200 with cross member 150 can help to enhance front end lateral rigidity. In particular, first extended member 208 in conjunction with first side reinforcing portion 204 provide a rigid connection between central portion 156 of cross member 150 and first strut tower 130. This arrangement can help to reduce relative movement between first side portion 114 of vehicle body structure 102 and upper panel 120. In a similar manner, second extended member 210 in conjunction with second side reinforcing portion 206 can provide a rigid connection between central portion 156 of cross member 150 and second strut tower 132. This arrangement can help to reduce relative movement between second side portion 116 of vehicle body structure 102 and upper panel 120. Additionally, cross member 150 acts to support axial load through third load bearing path 406 which is in contact with first load bearing path 402 and second load bearing path 404.

Figure 8:
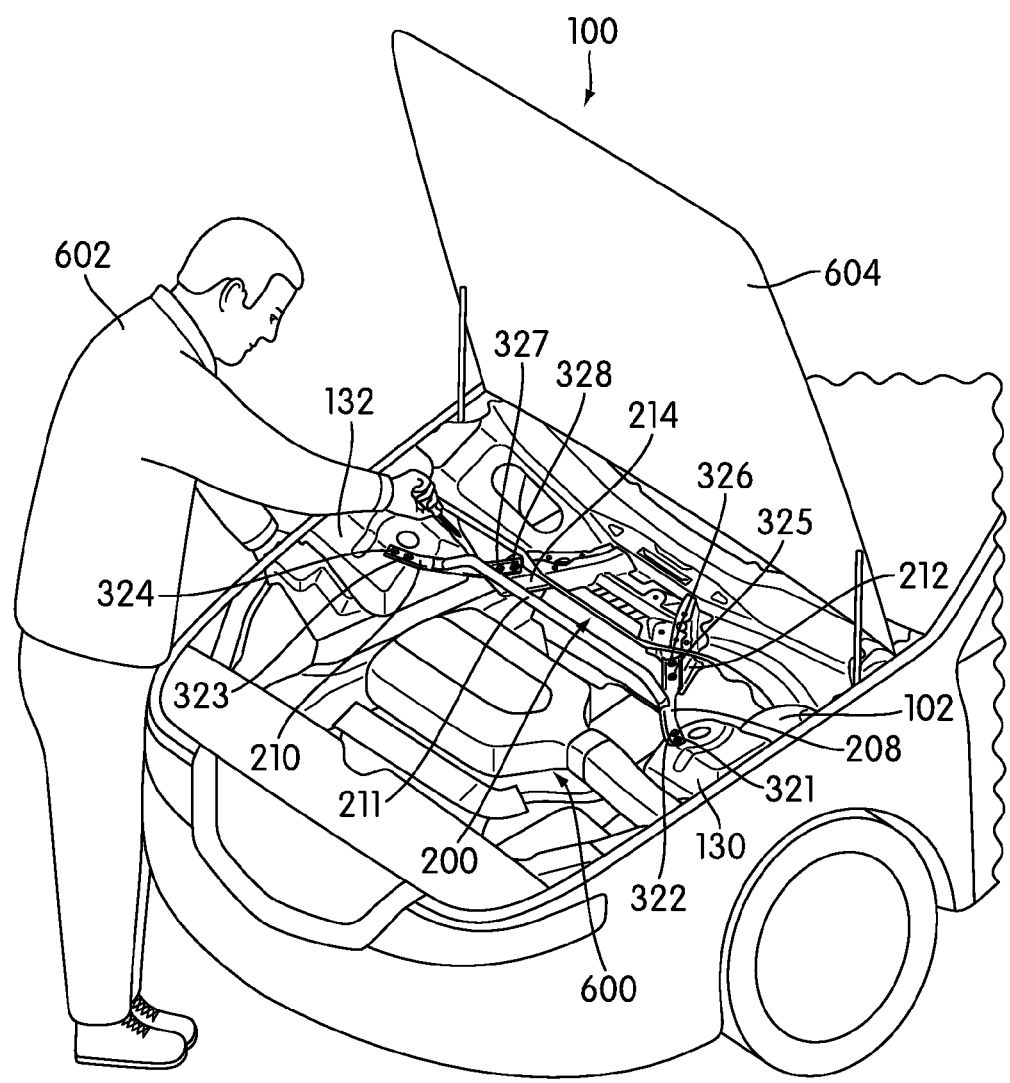
FIG. 8 is a schematic view of an embodiment of a motor vehicle including a tower bar assembly with removable portions.
Figure 9:
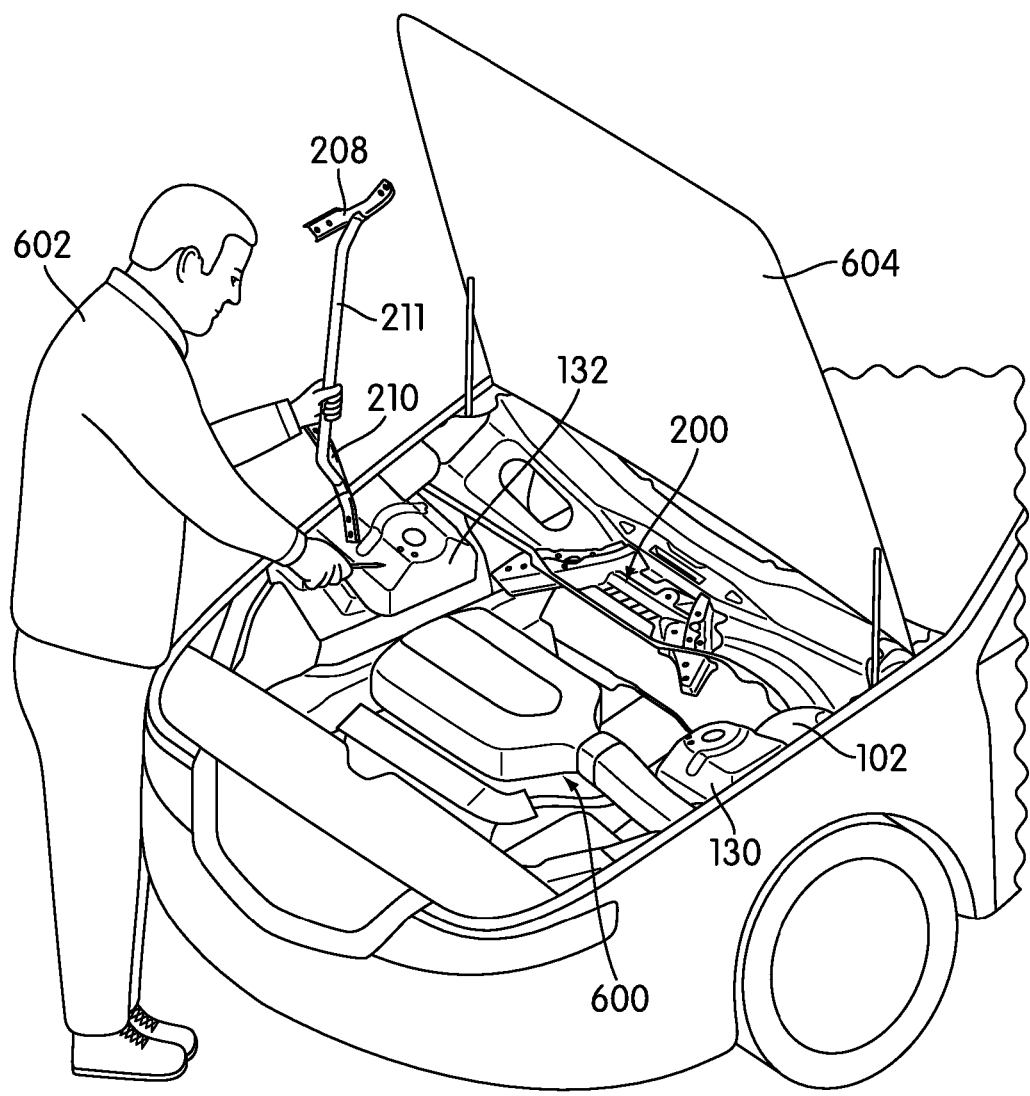
FIG. 9 is a schematic view of an embodiment of a motor vehicle including some portions of a tower bar assembly removed.

FIGS. 8 and 9 illustrate an embodiment of a tower bar assembly with easily removable portions configured to allow easy access to components of an engine compartment that are disposed below the tower bar assembly. Referring to FIGS. 8 and 9, mechanic 602 may open hood 604 of motor vehicle 100 to access engine compartment 600. In some cases, tower bar assembly 200 may partially block access to one or more components of engine compartment 600. Using the configuration described above for tower bar assembly 200, mechanic 602 can remove one or more portions of tower bar assembly 200 to gain access to partially blocked components.

As seen in FIG. 8, mechanic 602 may unfasten first extended member 208 and second extended member 210 from first strut tower 130 and second strut tower 132. In particular, mechanic 602 can remove first fastener 321, second fastener 322, third fastener 323 and fourth fastener 324. In addition, mechanic 602 may unfasten first extended member 208 and second extended member 210 from first bracket 212 and second bracket 214. In particular, mechanic 602 may remove fifth fastener 325, sixth fastener 326, seventh fastener 327 and eighth fastener 328. At this point, mechanic 602 can remove first extended member 208 and second extended member 210, as well as tower bar component 211, from vehicle body structure 102. This may allow mechanic 602 better access to a rear portion of engine compartment 600.

In different embodiments, the materials used for making one or more components of a tower bar assembly can vary. Examples of different materials that can be used include, but are not limited to: any metals or plastics. In embodiments where metallic materials are used, any metal or metallic alloy comprising iron, steel, magnesium, titanium, copper, or any other kind of metal or metallic alloy can be used. Furthermore, it will be understood that different portions of a tower bar assembly can be made of different materials to provide different material characteristics for different portions of the tower bar assembly. For example, in cases where it is desirable for one portion of a tower bar assembly to be more rigid than another portion, the two portions can be made from materials having different rigidities.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A motor vehicle, comprising:
a vehicle body structure including an upper panel, a first strut tower and a second strut tower;
a tower bar assembly configured to extend between the first strut tower, the second strut tower and the upper panel;
the tower bar assembly including a central reinforcing portion, the central reinforcing portion further including a base portion and wherein a portion of the base portion is spaced apart from the upper panel;
a first side reinforcing portion configured to connect a first side portion of the central reinforcing portion to the upper panel and a second side reinforcing portion configured to connect a second side portion of the central reinforcing portion to the upper panel;
wherein the central reinforcing portion, the first side reinforcing portion, the second side reinforcing portion and the upper panel enclose an interior space when viewed in a cross-section taken along a longitudinal axis of the central reinforcing portion;
wherein the tower bar assembly further includes:
a first extended member extending between the first side reinforcing portion and the first strut tower and a second extended member extending between the second side reinforcing portion and the second strut tower; and
a tower bar component extending between the first extended member and the second extended member;
the first extended member including a first end portion attached to the first strut tower, a second end portion associated with the first side reinforcing portion, and an intermediate portion disposed between the first end portion and the second end portion; and
wherein a first end portion of the tower bar component is attached to the intermediate portion of the first extended member.

2. The motor vehicle according to claim 1, wherein the central reinforcing portion includes a rib portion extending between the first side reinforcing portion and the second side reinforcing portion.

3. The motor vehicle according to claim 2, wherein the rib portion is configured to resist torsion at the central reinforcing portion.

4. The motor vehicle according to claim 1, wherein the upper panel is associated with a cross member that extends laterally across the vehicle body structure.

5. The motor vehicle according to claim 4, wherein the cross member is disposed adjacent to the central reinforcing portion.

6. The motor vehicle according to claim 1, wherein the tower bar component includes a second end portion and an intermediate portion disposed between the first end portion of the tower bar component and the second end portion of the tower bar component, and wherein the intermediate portion is angled with respect to the first end portion of the tower bar component and the second end portion of the tower bar component.

7. A motor vehicle, comprising:
a vehicle body structure including an upper panel, a first strut tower and a second strut tower;
the upper panel including a forward edge extending in a substantially lateral direction and a rearward edge extending in the substantially lateral direction;
a cross member attached to the rearward edge of the upper panel;
a tower bar assembly configured to extend between the first strut tower, the second strut tower and the upper panel;
the tower bar assembly including a central reinforcing portion configured to attach to the upper panel;
wherein the central reinforcing portion extends between the forward edge of the upper panel and the cross member;
wherein the tower bar assembly further includes:
a first extended member associated with the first strut tower;
a second extended member associated with the second strut tower; and a tower bar component extending between the first extended member and the second extended member;

the first extended member including a first end portion attached to the first strut tower, a second end portion associated with the upper panel, and an intermediate portion disposed between the first end portion and the second end portion; and wherein a first end portion of the tower bar component is attached to the intermediate portion of the first extended member.

8. The motor vehicle according to claim 7, wherein the tower bar assembly includes a first side reinforcing portion disposed adjacent to a first side portion of the central reinforcing portion and wherein the first side reinforcing portion is attached to the upper panel.

9. The motor vehicle according to claim 8, wherein the tower bar assembly includes a second side reinforcing portion disposed adjacent to a second side portion of the central reinforcing portion and wherein the second side reinforcing portion is attached to the upper panel.

10. The motor vehicle according to claim 9, wherein the first extended member extends from the first side reinforcing portion to the first strut tower and wherein the second extended member extends from the second side reinforcing portion to the second strut tower.

11. The motor vehicle according to claim 10, wherein the first side reinforcing portion and the first extended member form a first substantially continuous load bearing path between the first strut tower and the cross member and wherein the second side reinforcing portion and the second extended member form a second substantially continuous load bearing path between the second strut tower and the cross member.

12. The motor vehicle according to claim 7, wherein the tower bar component includes a second end portion and an intermediate portion disposed between the first end portion of the tower bar component and the second end portion of the tower bar component, and wherein the intermediate portion is angled with respect to the first end portion of the tower bar component and the second end portion of the tower bar component.

13. The motor vehicle according to claim 9, wherein a first bracket is used to connect the first extended member to the first side reinforcing portion and wherein a second bracket is used to connect the second extended member to the second side reinforcing portion.

14. A motor vehicle, comprising:

a vehicle body structure including an upper panel, a first strut tower and a second strut tower;

a tower bar assembly configured to extend between the first strut tower, the second strut tower and the upper panel;

the tower bar assembly including a first extended member associated with the first strut tower and a second extended member associated with the second strut tower;

the first extended member including a first end portion attached to the first strut tower, a second end portion associated with the upper panel and an intermediate portion disposed between the first end portion and the second end portion;

the tower bar assembly including a tower bar component extending between the first extended member and the second extended member; and wherein a first end portion of the tower bar component is attached to the intermediate portion of the first extended member.

15. The motor vehicle according to claim 14, wherein the tower bar component includes a second end portion and an intermediate portion disposed between the first end portion of the tower bar component and the second end portion of the tower bar component and wherein the intermediate portion is angled with respect to the first end portion of the tower bar component and the second end portion of the tower bar component.

16. The motor vehicle according to claim 15, wherein the vehicle body structure includes a longitudinal direction extending along the length of the vehicle body structure, a lateral direction extending along the width of the vehicle body structure and a vertical direction substantially perpendicular to the longitudinal direction and the lateral direction and wherein the intermediate portion is substantially raised in the vertical direction above the first end portion of the tower bar component and the second end portion of the tower bar component.

17. The motor vehicle according to claim 14, wherein the tower bar assembly includes a central reinforcing portion configured to attach to the upper panel.

18. The motor vehicle according to claim 17, wherein a rearward edge of the upper panel is associated with a cross member and wherein the central reinforcing portion extends from a forward edge of the upper panel to the cross member.

19. The motor vehicle according to claim 18, wherein the tower bar assembly includes a first side reinforcing portion disposed on a first side portion of the central reinforcing portion and wherein the first side reinforcing portion extends from the forward edge to the cross member.

20. The motor vehicle according to claim 19, wherein the tower bar assembly includes a second side reinforcing portion disposed on a second side portion of the central reinforcing portion and wherein the second side reinforcing portion extends from the forward edge to the cross member.

* * * * *